Figure 1:
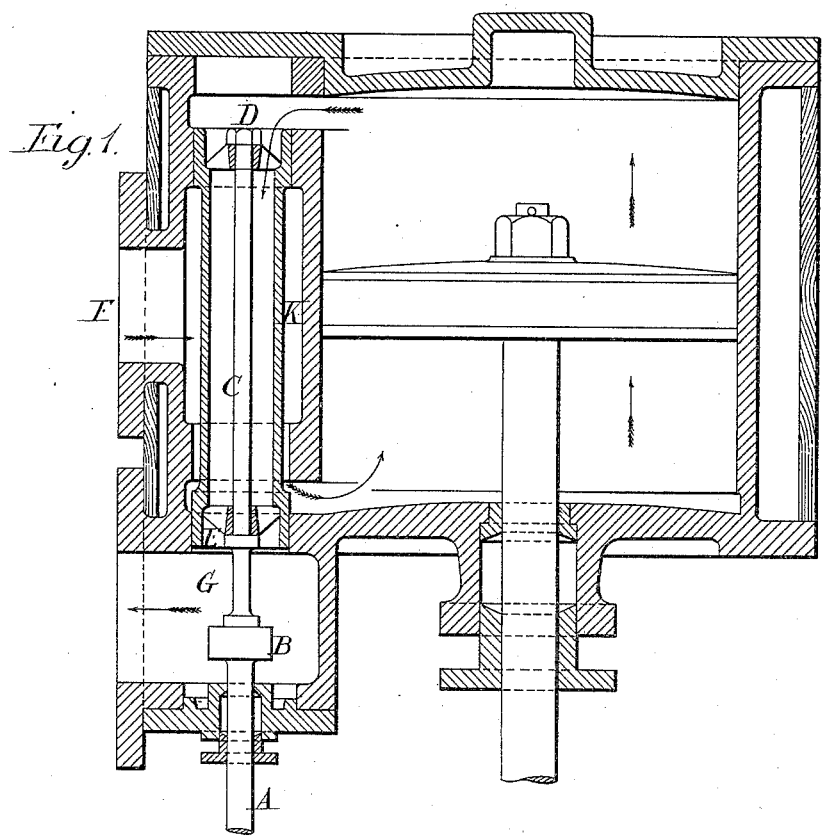

(No Model.)  5 Sheets—Sheet 1.

P. BROTHERHOOD.
VALVE FOR STEAM ENGINES.

No. 436,693.  Patented Sept. 16, 1890.

(No Model.) 5 Sheets—Sheet 2.

P. BROTHERHOOD.
VALVE FOR STEAM ENGINES.

No. 436,693. Patented Sept. 16, 1890.

(No Model.)  5 Sheets—Sheet 3.
P. BROTHERHOOD.
VALVE FOR STEAM ENGINES.

No. 436,693.   Patented Sept. 16, 1890.

(No Model.)

P. BROTHERHOOD.
VALVE FOR STEAM ENGINES.

No. 436,693.   Patented Sept. 16, 1890.

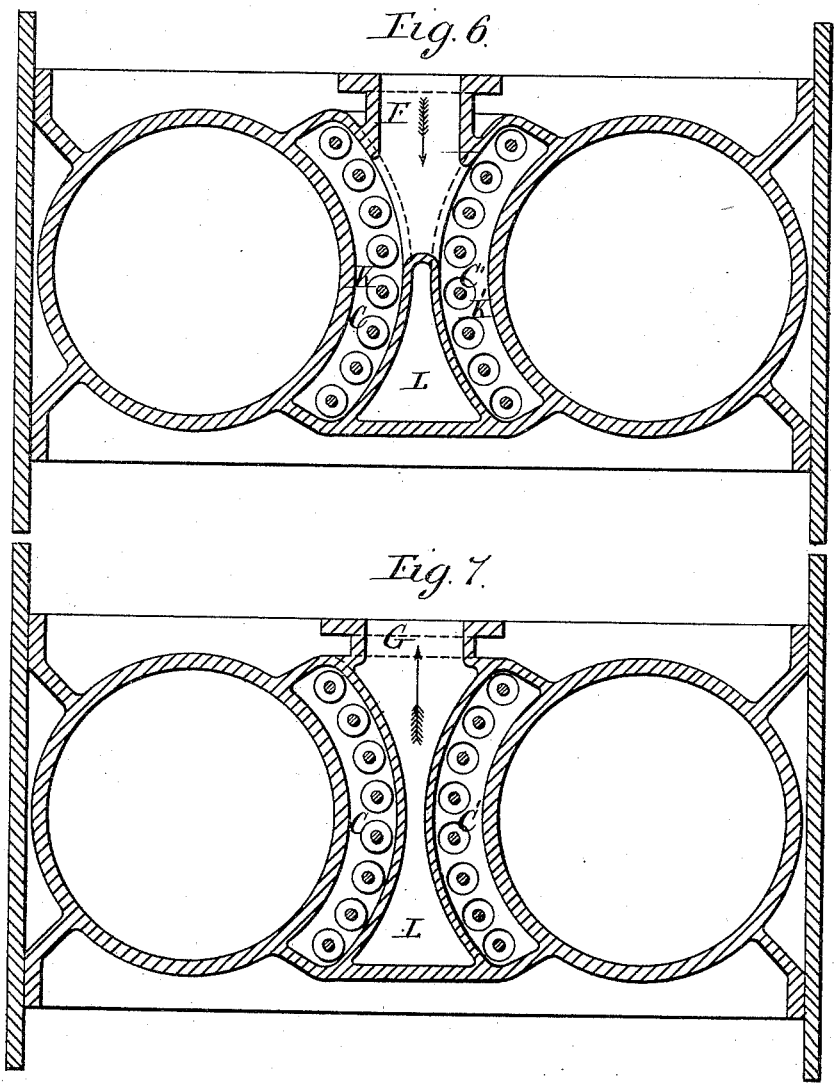

UNITED STATES PATENT OFFICE.

PETER BROTHERHOOD, OF LAMBETH, ENGLAND.

VALVE FOR STEAM-ENGINES.

SPECIFICATION forming part of Letters Patent No. 436,693, dated September 16, 1890.

Application filed June 25, 1890. Serial No. 356,626. (No model.) Patented in England March 4, 1890, No. 3,485; in France March 4, 1890, No. 204,139; in Belgium March 4, 1890, No. 89,699, and in Italy April 1, 1890, LIII, 158.

*To all whom it may concern:*

Be it known that I, PETER BROTHERHOOD, a citizen of England, residing at Belvedere Road, Lambeth, in the county of Surrey, England, have invented an Improvement in Slide-Valves for Steam and other Fluid-Pressure Engines, (for which I have obtained patents in Great Britain, dated March 4, 1890, No. 3,485; France, dated March 4, 1890, No. 204,139; Belgium, dated March 4, 1890, No. 89,699, and Italy, dated April 1, 1890, Vol. LIII, No. 158,) of which the following is a specification.

My invention has for its object to simplify the construction and action of slide-valves for steam and other fluid-pressure engines, to obtain compactness in their arrangement, and at the same time to secure large area of passage for the working-fluid consistently with very small clearance-space in the passages to the cylinder. For this purpose I subdivide the slide-valve into a number of separate valves, each in the form of a piston-valve governing a circular hole close to the cylinder-port, and I connect the stems of these separate piston-valves to one operating-rod, which is worked by eccentric or other ordinary gear.

The accompanying drawings show my invention applied to steam-engine cylinders under various conditions.

In order to illustrate the general application of my invention, I show in the drawings valves arranged somewhat differently in relation to the cylinders, so as to suit the special working conditions in each case. I do not, however, in the present application for patent propose to claim any of these arrangements except that shown by Figures 1 and 2, the other arrangements being subjects of other applications for patents of even date with the present.

Figure 2:
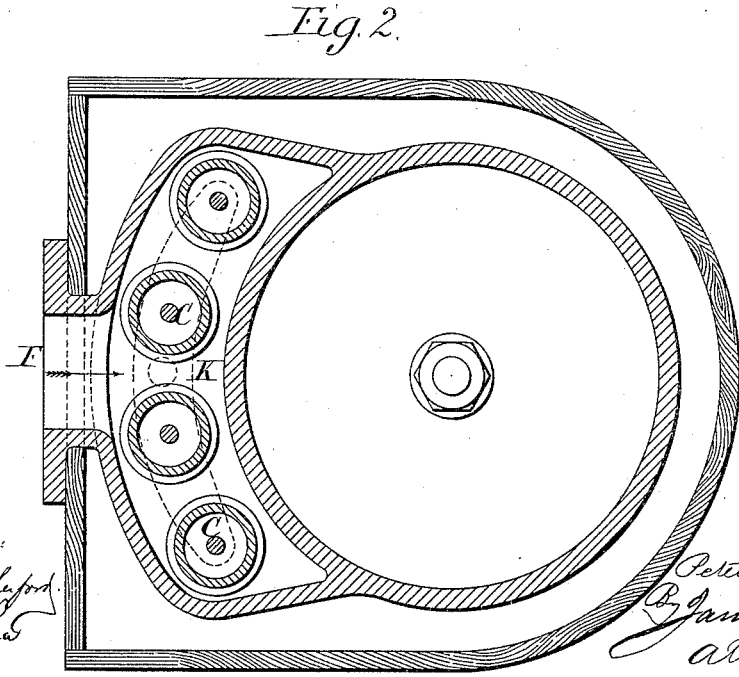
Figure 3:
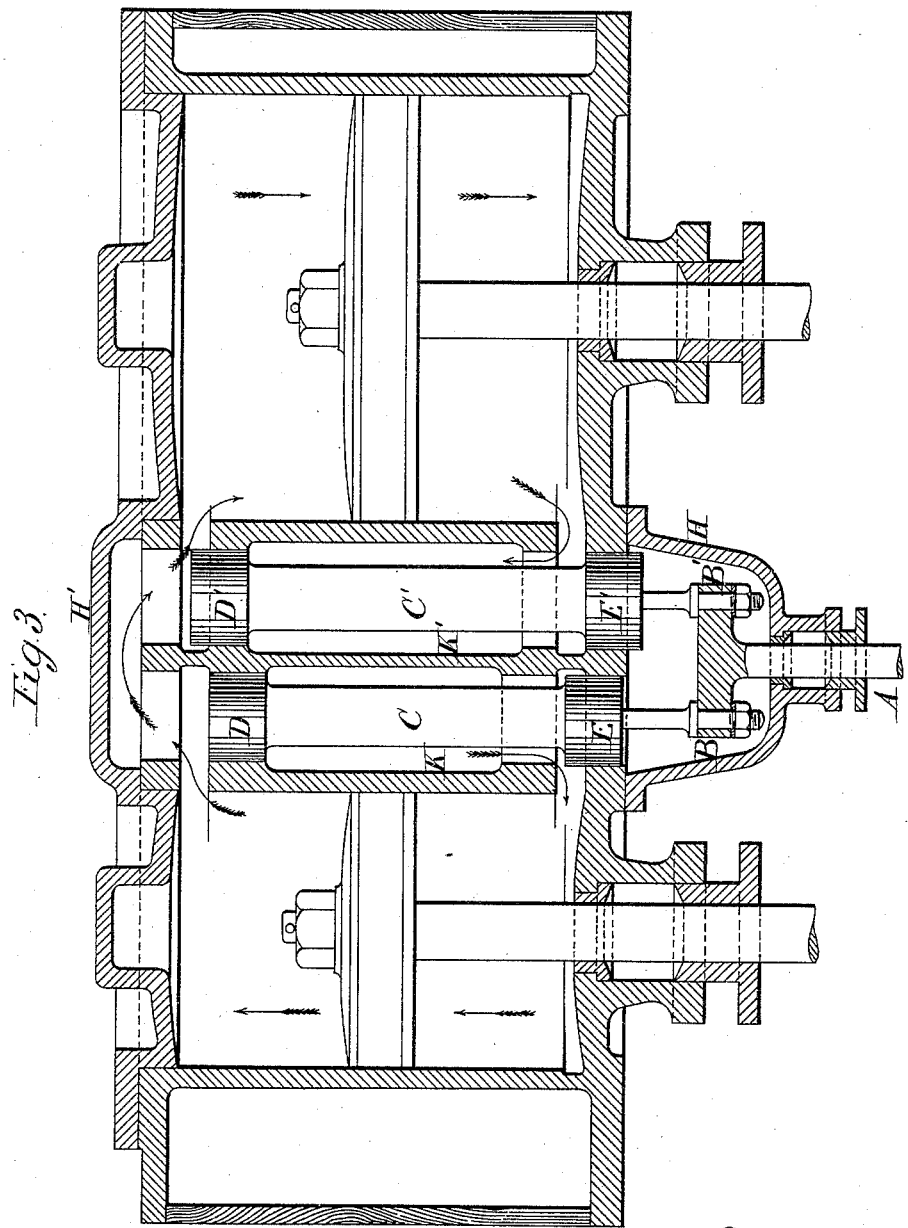
Figure 4:
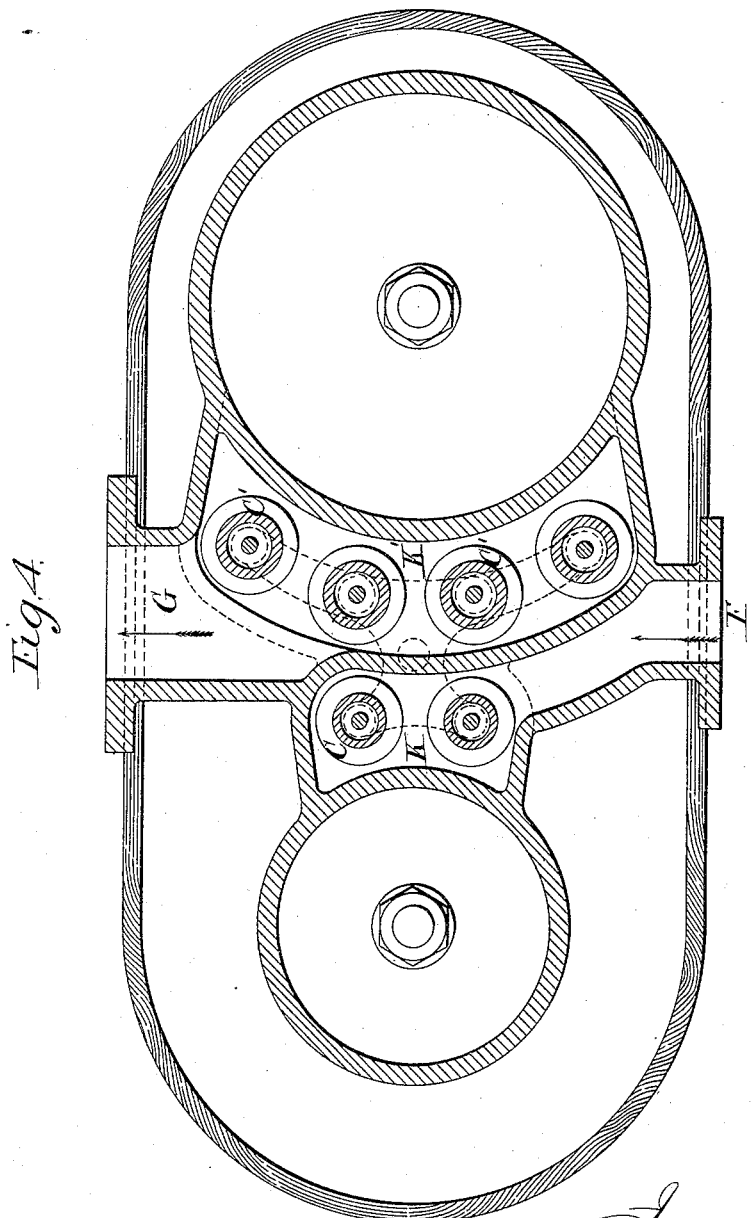
Figure 5:
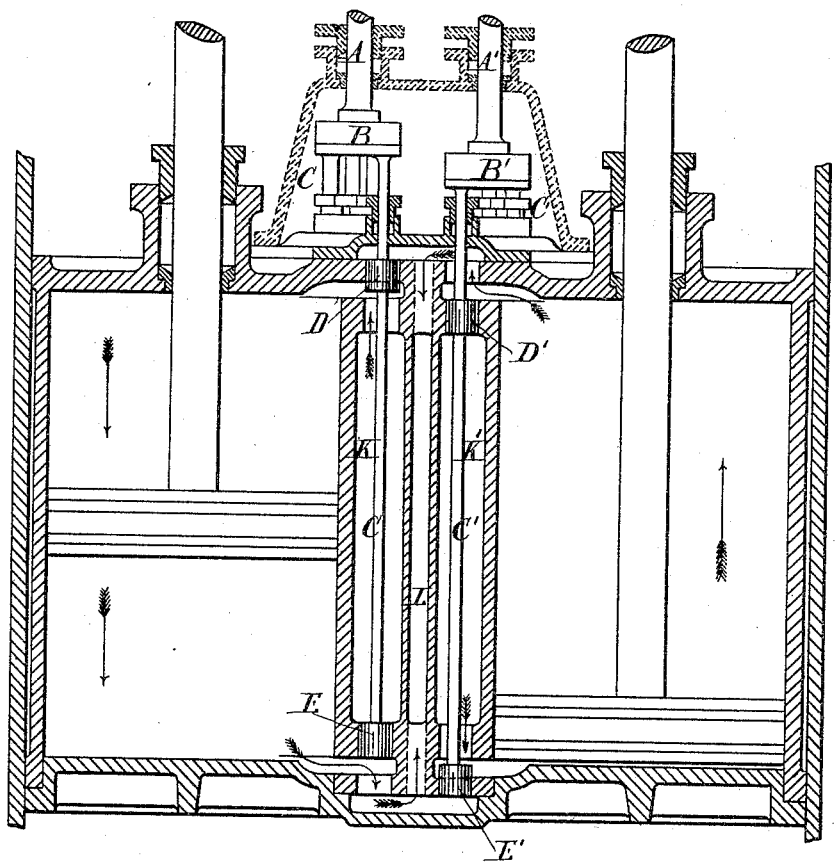

Fig. 1 is a vertical section, and Fig. 2 is a sectional plan, showing valves according to my invention applied to a single cylinder. Fig. 3 is a vertical section, and Fig. 4 is a sectional plan, showing an arrangement of valves according to my invention for a compound engine having a high and a low pressure cylinder. Fig. 5 is a longitudinal section showing valves according to my invention applied to an engine having two cylinders side by side, as for a locomotive. Fig. 6 is a transverse section of the same through the steam-supply passage, and Fig. 7 is a transverse section through the exhaust-passage.

In the figures corresponding parts are marked with corresponding letters of reference.

Referring to Figs. 1 and 2, the slide-rod A has attached to it a cross-head B, to which are attached the rods C of the several upper valves D and lower valves E, each valve being a simple piston fitting circular holes formed in partitions close to each cylinder-port. The steam enters at F into the space K, surrounding the bodies of the slide-valves, which are tubular, so that the exhaust from the upper ports passes down through them to the space G below, in which the cross-head B is free to move.

Referring to Figs. 3 and 4, the main slide-rod A is attached to two cross-heads B B' within a cap H, and to these cross-heads are attached the rods C of the high-pressure slides D and E, and also the rods C' of the low-pressure slides D' and E'. At the top there is a cap H', forming a communication between the upper ports of the two cylinders, the cap H forming a similar communication between the lower ports. The steam enters at F into the space K, surrounding the bodies of the high-pressure slides. The exhaust from the high-pressure cylinder passes directly through the cap H or H' to the low-pressure cylinder, and the exhaust from the low-pressure cylinder passes into the space K', surrounding the bodies of the low-pressure slides, and thence by the exhaust-passage G. The slides in this case are tubular, so as to equalize the pressure above and below in the spaces H' and H.

Referring to Figs. 5, 6, and 7, the two main slide-rods A A' are attached, respectively, to cross-heads B B', to which are attached the rods C C' of a number of piston slide-valves. The steam enters by F the spaces K K', surrounding the slide-rods, between the two pistons D and E and D' and E'. The exhaust-steam passes into a middle space L, whence it passes away by G. As shown in Fig. 5, the slide-rods C C' pass through separate stuffing-boxes. The cross-heads B B' might, however, be accommodated within a cap, (indicated by the dotted lines H,) only the two main slide-rods A A' passing through stuffing-boxes in the cap.

Having thus described the nature of my invention, and the manner of carrying the same into practical effect, I claim—

1. A slide-valve for a steam or other fluid-pressure engine made in several separate parts, each part consisting of two connected pistons, each piston fitting circular holes through partitions separating the end port of the cylinder from the supply and exhaust passages, and all the rods of these several pairs of pistons being connected to the main slide-rod, substantially as and for the purposes set forth.

2. In combination with partitions separating the end cylinder-ports of a steam or other fluid-pressure engine from the supply and exhaust passages, and having several circular holes through them, several connected pairs of pistons fitting these circular holes, and a main slide-rod to which all the pairs of pistons are connected, substantially as described.

In testimony whereof I have signed my name to this specification, in the presence of two subscribing witnesses, this 9th day of June, A. D. 1890.

PETER BROTHERHOOD.

Witnesses:
OLIVER IMRAY,
*Patent Agent, 28 Southampton Buildings, London, W. C.*
JNO. P. M. MILLARD,
*Clerk to Messrs. Abel & Imray, Consulting Engineers and Patent Agents, 28 Southampton Buildings, London, W. C.*